3,082,360
ELECTROLYTIC CAPACITORS
Preston Robinson and Richard J. Millard, Williamstown, Mass., assignors to Sprague Electric Company, North Adams, Mass., a corporation of Massachusetts
Filed May 13, 1953, Ser. No. 354,814
7 Claims. (Cl. 317—230)

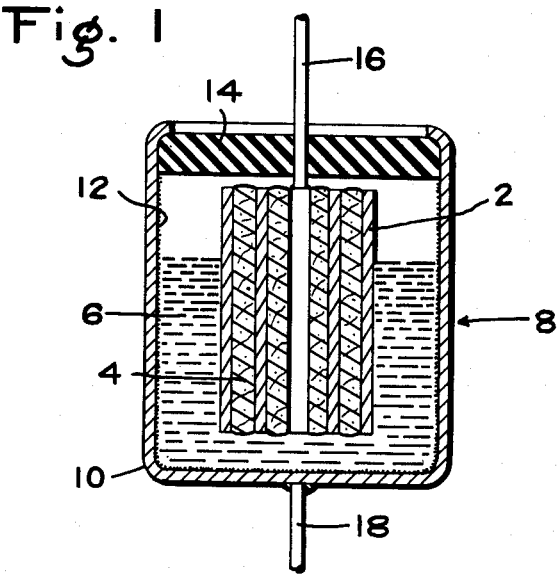
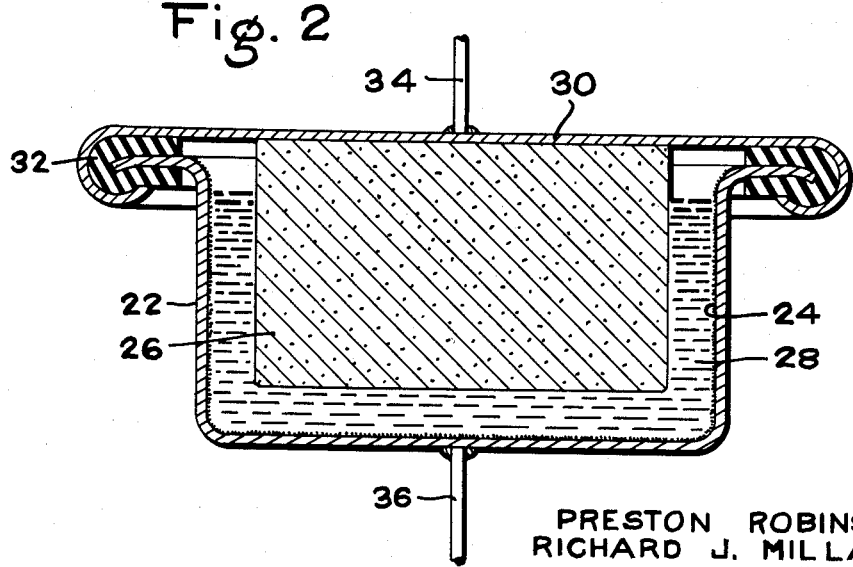

This invention relates to electrolytic capacitors and more particularly relates to the cathodes of such devices.

Present day requirements in electronic applications have necessitated the advent of electrolytic capacitors of extremely small size. The discovery of the transistor has tremendously increased this need, for with transistors extremely small electrical apparatus is possible and components of moderate size are undesirable in these apparatus.

With this advent of extremely small electrolytic capacitors for transistor use which requires very small voltages, the anode capacity became much greater per unit area of surface than in the former electrolytic capacitors operating at higher voltages and having relatively thick formed dielectric layers. These miniature capacitors which have been prepared from anode materials of both etched and unetched foil and porous sintered pellets, have been found to vary considerably in their capacitance and equivalent series resistance. It was further found that the individual units themselves varied considerably with the voltages imposed upon them and the duration of use. Particularly after aging it is found that the small capacitor had the highly undesirable property of decreased capacitance and increased resistance. These undesirable electrical characteristics, associated with high capacitance per unit area of the anode, were found to be little benefited by etching of the cathode.

It is an object of this invention to overcome the foregoing and related disadvantages. It is a further object of this invention to develop an electrolytic capacitor of miniature size having stability of capacitance and low series resistance. Further objects and advantages of this invention will be apparent from the following description and drawings.

The drawings attached hereto indicate two types of miniature electrolytic capacitors comprising the instant invention, FIGURE 1 showing a cross-section of a foil type electrolytic capacitor and FIGURE 2 showing a cross-section of a sintered porous anode electrolytic capacitor.

The above objects are attained in accordance with the present invention by providing an electrolytic capacitor with a formed anode, a composite cathode comprising the combination of an impervious support and an intimate layer of adherent minute particles of a conductor, and an electrolyte electrically connecting said anode to said cathode.

The objects are further attained in accordance with the present invention by providing an electrical capacitor with a formed anode foil, a composite cathode comprising the combination of a metal, and a porous conductive layer of greatly expanded surface area, and an electrolyte electrically connecting said anode to said cathode.

In a more restricted sense the invention is concerned with an electrolytic capacitor comprising a noble metal container, a spongy layer of particles deposited on the inner surface of said container, a porous anode pellet positioned within said container and electrically insulated from said container, an electrolyte connecting said anode and said container, and means for maintaining said electrolyte within said container.

FIGURE 1 expresses a cross-section of a representative film foil type of miniaturized electrolytic capacitor, wherein the formed metal foil 2 is convolutely wound with a porous spacer 4 so as to expose all of the formed surface area to the electrolyte 6 contained within the capacitor. The formed foil which serves as the anode of the capacitor can be any of the well-known valve forming metals such as aluminum, tantalum, zirconium, etc. selected in accordance with the particular application for which it is desired, the electrolyte which is used, and the cost of the product. The anode 2 which may be a thin flat plate or may be convolutely wound as indicated in the drawing, is contained within the volume defined by the cathode 8 which functions as the outer shell for the device. The cathode 8 consists of an outer conducting shell 10 of a metal which is selected for the particular application to which the device is to be put. If the contained electrolyte 6 is particularly corrosive and oxidizing in nature, the outer conductor 10 of the composite cathode 8 is preferably a noble metal such as silver, gold, platinum, palladium, etc. Positioned as an intimate layer on the inner surface of the cathode metal 10 is the layer 12 of particles which serves to greatly increase the surface area of the cathode. A discussion of the layer 12 and its composition is elaborated on hereafter. A gasket 14 serves to electrically isolate the cathode 8 from the anode tab 16 which serves as one terminal of the device and furthermore this gasket 14 prevents the egress of the electrolyte 6 from the interior of the capacitor. 18 represents the cathode tab which is welded to the composite cathode 8.

Reference is made to FIGURE 2 which portrays an electrolytic capacitor with a metal container 22 which has deposited upon its inner surface an adherent relatively non-oxidizable conducting layer 24 of an extremely large number of particles of minute diameter. Positioned within the container is a sintered porous anode pellet 26 of the type well-known in the art. Between the composite cathode and the anode 26 is an electrolyte 28 which forms the electrically conducting medium between the formed anode and the cathode of this electrolytic device. The anode pellet 26 is attached to a metal cover 30 which has flanges extending beyond the edge of the container 22 and crimped inwardly against an inert gasket 32 to seal the electrolyte within the electrolytic capacitor. The anode and cathode leads 34 and 36, respectively, are shown attached to their respective sections of the capacitor. The capacitor must be sealed to prevent the egress of the electrolyte from the container and this may be accomplished in the manner set forth in the Schroeder Patent No. 2,636,063, granted April 21, 1953.

It has been found that the variation in capacitance over a period of time and the development of a high series resistance value in prior art miniature capacitors is due to the presence of a film which has formed upon the cathode. As this film formed it introduced a lowered capacitance in series with the capacitance of the anode thereby greatly reducing the effective capacitance of the entire capacitor. Also, since this film is at the metal-electrolyte interface it would introduce an added component of resistance to that exhibited by the electrolyte. It was further found that this film formation is initiated whenever voltage is applied to the unit such as would occur during normal operation and that if this film is removed thereafter it quickly reforms whenever the unit is subjected to subsequent operation. Additionally, it was found that the cathode film could be destroyed for a very short period of time by the application of a reverse potential for a short period, but whether the film is destroyed by application of a reversed potential or by mechanical or chemical action it should be realized that these methods are only temporary measures which do nothing to prevent subsequent film formation. It should be realized that with some electrolytes reverse voltage would form a film which would further increase its undesirability. The prior art has suggested that it is desirable at least for aluminum electrolytic capacitors to roughen the surface of the cathode by such means as etching. Present etching methods, however, result in only minor changes in film areas, the cathode only increasing by factors of 3 to 6 and it has been found that any benefit from this technique was usually not even perceptible in correcting the difficulties seemingly inherent to the miniaturized foil and sintered pellet anode electrolytic capacitors.

However, by depositing upon the surface of the cathode a thin adherent film of minute particles of a material which was for all practical purposes non-oxidizable by the contained electrolyte, the surface area of the cathode was increased by factors of 1000 and greater and any film formation which might occur upon this layer was so minute in thickness that extremely high series capacitances were achieved. By making the series capacitance of the cathode of a much greater magnitude than that of the formed anode the resultant capacity of the entire unit was greatly increased over that previously possible with capacitors having either plain or etched cathodes. Additionally, it was found that the deposition of this porous layer upon the cathode greatly reduced the series resistance which appeared on aging whenever etched or unetched noble metal cathodes were used. It must be emphasized that this phenomena became apparent only when formed anodes were used having capacitances approaching the capacity of the cathode e.g. the anode capacity is greater than one-tenth of the capacity of the cathode.

A preferred embodiment concerns itself with the deposition of a thin layer of lead peroxide upon the inner surface of the metal container which forms part of the cathode as shown in FIGURE 1. In this embodiment of the invention the container is made of silver and is internally coated with a thin film of lead. This lead film may be deposited by evaporating lead under vacuum by techniques which are well-known in the art. The lead film is then subsequently converted to lead peroxide by placing within the lead filmed container a sulfuric acid electrolyte solution. The container is connected to the positive lead of the direct current source which may be a battery, while a substantially pure lead electrode is connected to the negative lead of the direct current source and is positioned in the electrolyte. During the electrolytic action the lead film on the cathode container is gradually converted to lead peroxide. It is desirable to convert the entire deposited thin lead film to the lead peroxide. A lead peroxide film was obtained with the above technique by placing a sulfuric acid electrolyte in the cathode container having a lead film deposited on its inner surface and thereafter electrolizing it for 60 minutes at a current density of 100 milliamperes per square centimeter of anode surface. After the electrolizing the coated container was washed with water and dried and thereafter assembled with the other components into an electrolytic capacitor having an etched aluminum foil formed to 5 volts in boric acid. A porous glass fiber spacer was used with an electrolyte consisting of ammonium pentaborate in ethylene glycol and a small percentage of water.

Another embodiment which overcomes the difficulties associated with these electrolytic capacitors having etched or unetched cathodes is the deposition of a thin compressed layer of micro pulverized graphite upon the inner surface of the metal container. The graphite particle size is preferably within the range of from about 0.5 to about 10 microns average diameter and may be compressed into a mold disc which is positioned at the bottom of the cathode container or alternatively may be molded into a shell which is positioned upon the inner surface of the cathode container so as to cover virtually all of the exposed inner surface of the cathode. Suitable pressures for molding these graphite cathode inner layers are from 500 to 400 pounds per square inch. As an example of this, synthetic graphite, particle size 0.5 micron, is compressed under 3800 pounds per square inch into a shell positioned adjacent to the inner surface of the noble metal cathode. Thereafter the compressed pellet was immersed in an electrolyte solution containing 30% by weight of sulfuric acid for a period of 24 hours so that it would be fully saturated with the electrolyte. By the use of moderate pressures in the compression of the graphite the resistance to the passage of electrolyte is maintained at a minimum and results in no increased series resistance. In addition to the synthetic graphite it is possible to use natural graphite, acetylene, carbon black and other materials possessing similar conductivity, resistance to oxidation and particle size.

A third preferred embodiment of the invention was prepared by coating the inner surface of a silver cathode container with an adherent layer of porous non-oxidizable metallic composition. The deposition of the particular layer upon the cathode container was accomplished by electrolytic action. An aqueous electrolyte of platinum chloride and lead acetate was placed inside the silver container. Upon an electrolysis of 2 minutes with a current density of 400 milliamperes per square inch, a highly porous adherent layer was prepared. This composite cathode which has an area of 0.518 square inch before the deposition of the adherent layer was incorporated into a 40 mfd., 50 v. D.C. tantalum pellet capacitor. Tests were conducted to compare the unit of the invention with similar capacitors having both etched and unetched cathodes. The results are:

| Unit No. | Type of Cathode | Initial Characteristics | | Electrical Characteristics After Aging [1] | |
| --- | --- | --- | --- | --- | --- |
| | | Cap., mf. | R×C [3] | Cap., mf. | R×C [3] |
| 1 | Composite | 41.3 | 73 | 41.3 | 54 |
| 2 | do | 38.6 | 60 | 38.9 | 48 |
| 3 | do | 44.6 | 55 | 44.5 | 53 |
| 4 | do | 40.5 | 54 | 40.6 | 53 |
| 5 | Plain unetched | 29.8 | 120 | 32.8 | 180 |
| 6 | do | 30.4 | 123 | 30.6 | 143 |
| 7 | do | 29.3 | 118 | 32.0 | 146 |
| 8 | do | 32.6 | 120 | 35.9 | 101 |
| 9 | Etched [2] | 38.8 | 67 | 32.8 | 102 |
| 10 | do [2] | 37.3 | 180 | 32.2 | 244 |
| 11 | do [2] | 36.3 | 126 | 29.4 | 145 |
| 12 | do [2] | 38.6 | 98 | 28.7 | 149 |

[1] After aging 336 hours at 110° C. with an applied static potential of 40 v. D.C.
[2] The cathode was chemically etched in a 50% nitric acid solution at a temperature of 70° C. for 1 minute.
[3] Series resistance in ohms times the capacity in microfarads.

The foregoing data show the remarkable advantages of the capacitor embodying the invention over the prior art device. The capacitance of the inventive device is materially increased over capacitances available from similar units not having the composite cathode and furthermore it must be pointed out that the series resistance of the prior art units is much higher than the units of the present invention as evidenced by the R×C figure.

It has been further noted that when the electrolytic capacitor is subjected to a bias and thereafter low frequencies of alternative potential are imposed upon the capacitor electrodes the difference between the inventive device and the prior art capacitors becomes even more dramatic. Representative data is given below:

| Unit No.[1] | Type of Cathode | Capacitance (mf.) | |
|---|---|---|---|
| | | 60 Cycles | 1,000 Cycles |
| 1 | Plain | 14.4 | 9.4 |
| 2 | Etched | 23.5 | 12.0 |
| 3 | Composite | 31.3 | 24.0 |

[1] Tantalum pellet and sulfuric acid electrolyte.

The structure of this disclosed electrolytic capacitor can be used with any of the known types of liquid electrolytes. Whether these electrolytes are corrosive or noncorrosive in nature has no import to the present invention as these thin inherent films which exist upon the composite cathode are found to be relatively unimpaired by strongly corrosive electrolytes such as sulfuric acid. The cathode can be used equally satisfactorily for both corrosive and noncorrosive electrolytes.

As indicated in the previous discussion, this invention is believed to be primarily concerned with capacitors whose anode capacity has approached that of the cathode capacity. In the higher voltage electrolytic capacitors of much greater size, which have previously existed in this art, the variation of the capacity of the cathode apparently was not perceptible in electrical behavior inasmuch as the capacity of the cathode was much greater than that of the anode. In these present day miniaturized capacitors having very thin dielectric layers as evidenced by the low formation voltages to which they are exposed, the capacitance of the anode has greatly increased per unit area until it has apparently achieved a value sufficiently close to that of the cathode capacity so that the sum of the capacities of the two electrodes is of such magnitude that any variation in the cathode capacity is sufficient to be reflected as a change in the overall capacity of the component. It is believed that electrolytic capacitors, wherein the capacity of the cathode is less than 10 to 20 times the capacity of the anode, that this disclosed cathode structure is vital to overcome the objectionable electrical characteristics of the component. It must be realized that the more rigid the requirements, as far as operational stability and life resistance characteristics are concerned, the sooner the capacity of the cathode must be taken into consideration as the anode capacity approaches it in magnitude. As examples of this, it is believed that plain foil type capacitors whose plain foil anodes are formed to voltages of 10 volts and less and foil capacitors whose etched anodes are formed to voltages below 5 volts and pellet type electrolytic capacitors of any formation voltage, are greatly improved by application of this disclosed invention. The cathode structure forming a portion of the present invention has been primarily discussed as a composite structure of a noble metal outer layer with an adherent intimate layer of relatively non-oxidizable material. It is to be realized that the necessity of an outer layer of a noble metal is removed by the utilization of non-oxidizing electrolytes such as one consisting primarily of ammonium penta borate and a polyhydric alcohol. With a relatively non-oxidizing electrolyte the metal container can be any of the well-known metals useful for these applications such as aluminum, zinc, copper, steel, iron and nickel. It is within the scope of the present invention to use a porous layer of expanded surface area of the same composition as the supporting layer which has been illustrated in each of the figures as the outer container. Furthermore, according to this invention the cathode can consist solely of a mass of particles such as a graphite shell held by a non-conducting support which serves merely as a mechanical support and to contain the electrolyte. The support can be either organic or inorganic in nature.

The capacitors embodying the present invention are characterized by numerous advantages over previously known electrolytic devices, some of which are apparent from the foregoing discussion and others which are primarily important productionwise which have not yet been considered. An advantage of using the composite cathode consisting of the noble metal base material and the adherent layer of non-oxidizable particulate conducting medium is that the previously considerable numbers of rejects in the commercial production of pellet capacitors are for all practical purposes eliminated. The prior reasons for rejection were for low capacitance and high series resistance. It is now apparent that in order to attain higher capacitance per unit volume, this disclosed composite cathode is necessary. The inventive device is further characterized by unusual stability under operating conditions for long periods of time as well as having a much wider frequency range of operation than hitherto possible. This device which has formed the basis of our invention is characterized by unusual stability of normal operating temperatures of from 20° C. and up. Even more spectacular electrical properties are found when this electrolytic capacitor is operated under subnormal conditions. At temperatures as low as −60° C., it has been found that the capacitance decreases only slightly over that at room temperatures, whereas the capacitance of previously known capacitors, using the same type of electrolyte, decreases to magnitudes of about 20% or less. Finally, the present capacitors have a relatively constant capacitance under bias operation from zero to a substantial D.C. bias.

As many apparently widely different embodiments of this invention may be made without departing from the spirit and scope thereof, it is to be understood that the invention is not limited to the specific embodiments hereof except as defined in the appended claims.

What is claimed is:

1. An electrolytic condenser in which one electrode only has been subjected to the forming process, comprising a casing adapted to act as the other electrode, and means for enlarging the surface of said other electrode which is in contact with the electrolyte, said means comprising a coating of spongy noble metal on the parts of said other electrode which are in contact with the electrolyte, said noble metal comprising one of the noble metals of the group consisting of platinum and palladium.

2. An electrolytic condenser, as claimed in claim 1, in which the spongy noble metal is spongy platinum.

3. The electrolytic condenser of claim 1 in which the casing is a silver casing.

4. The electrolytic condenser of claim 1 wherein the electrolyte is sulfuric acid.

5. The electrolytic condenser of claim 1 wherein the electrode subjected to the forming process is formed of tantalum.

6. The electrolytic condenser of claim 5 wherein the electrode subjected to the forming process is a sintered porous tantalum pellet.

7. An electrolytic condenser comprising a sealed silver cathode casing containing sulfuric acid as electrolyte, a sintered porous tantalum pellet within said casing, a cathode lead connected with said casing, an anode lead connected with said anode pellet and extending externally of the casing, and means for enlarging the surface of said cathode casing which is in contact with said sulfuric acid electrolyte, said means comprising a coating of spongy noble metal on the parts of said cathode which are in contact with the electrolyte, said noble metal comprising one of the noble metals of the group consisting of platinum and palladium.

References Cited in the file of this patent

UNITED STATES PATENTS

| 368,608 | Peyrusson | Aug. 23, 1887 |
| 1,706,951 | Benner | Mar. 26, 1926 |

(Other references on following page)

UNITED STATES PATENTS

| | | |
|---|---|---|
| 1,889,417 | Mershon | Nov. 29, 1932 |
| 2,060,022 | Brennan | Nov. 10, 1936 |
| 2,104,019 | Brennan | Jan. 4, 1938 |
| 2,616,953 | Booe | Nov. 4, 1952 |
| 2,617,863 | Stinson | Nov. 11, 1952 |
| 2,743,399 | Bujan | Apr. 24, 1956 |
| 2,743,400 | Bujan | Apr. 24, 1956 |
| 2,871,423 | Aikman | Jan. 27, 1959 |

FOREIGN PATENTS

| | | |
|---|---|---|
| 355,965 | Great Britain | Sept. 3, 1931 |
| 531,283 | Germany | Aug. 7, 1931 |